Oct. 6, 1959 P. MÜLLER 2,907,263
POT-HOUSE OF AN ALUMINUM REDUCTION PLANT
Filed Feb. 25, 1957
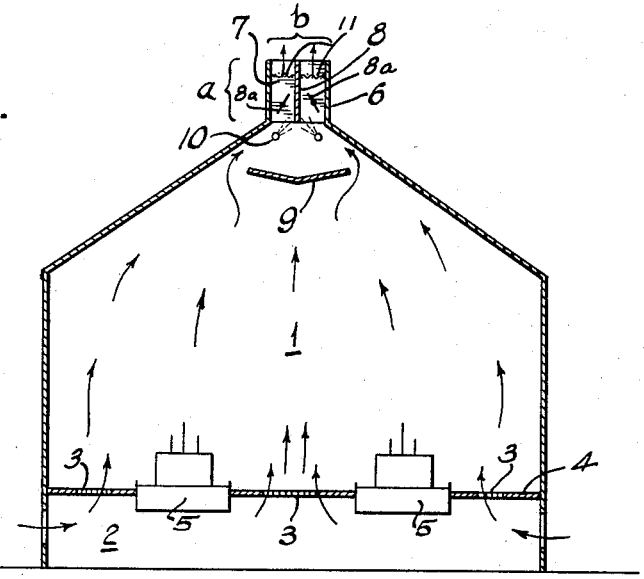
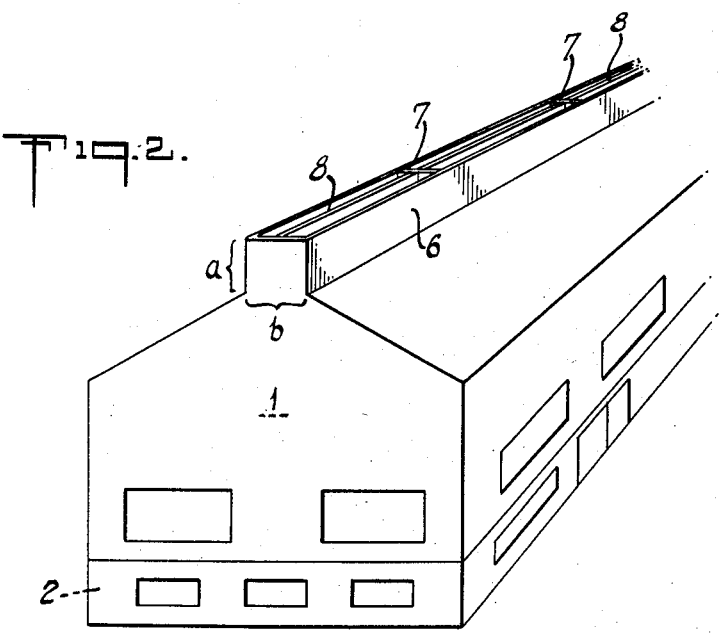
INVENTOR:
PAUL MÜLLER
BY
ATTORNEYS.

United States Patent Office 2,907,263
Patented Oct. 6, 1959

2,907,263

POT-HOUSE OF AN ALUMINUM REDUCTION PLANT

Paul Müller, Kusnacht, Zurich, Switzerland, assignor to Aluminium - Industrie - Aktien - Gesellschaft, Chippis, Switzerland, a joint-stock company of Switzerland Application February 25, 1957, Serial No. 642,069

Claims priority, application Switzerland February 27, 1956

12 Claims. (Cl. 98—115)

In the production of aluminum by electrolysis of a fused salt bath a great amount of heat is developed and transferred to the air and has to be dissipated. The pot-houses containing the electrolytic cells must therefore be designed so as to enable an efficient ventilation; it is necessary to change the whole air 30 to 40 times an hour. In most cases the change of air is ensured without forced draft devices or ventilators or other special power-actuated means but only by the lift of the hot air. To ensure the ventilation of the pot-house, its walls and its roof are generally provided with numerous openings such as doors, windows, scuttles and chimneys.

On the other hand, the fluorine containing salt bath in the electrolytic cells always releases fluorine through the waste gases in the form of dust. One tries therefore to collect the waste gases from the cells as completely as possible and to recover the fluorine components. But it is not possible to close entirely and tightly the cells, as one has to open them frequently for operations by labor. Notwithstanding the exhaust devices it is therefore not possible to prevent the waste gases and dust from escaping into the pot-house and from there into the open air because of the continuous change of air which is necessary to maintain a temperature supportable for the workmen and to produce satisfactory air conditions. In many plants one tries to clean the air leaving the pot-house, for which purpose spraying devices have been disposed in superstructures on the roof-ridge. But partly because of the effect of the wind, the escape of a part of the contaminated air through doors, windows and other openings, where it cannot be sprayed with water, cannot be avoided.

My present invention relates to a pot-house of special design which ensures in a simple way a sufficient ventilation and at the same time enables all air leaving the pot-house to be cleaned. For this purpose the pot-house according to my invention is provided with fresh air supply openings only in the floor and possibly in the side walls but at most up to one third of the height from the floor to the roof-ridge. On the roof-ridge of this pot-house chimneys are provided spraying devices, the sprays of which are directed in the general direction of the air flow to exercise an injector aspirating effect. These spraying devices are arranged in such a way that the hot rising air can leave the pot-house without the help of power-actuated or forced draft ventilators in a natural current only through these chimneys, thereby cleaning the foul air as it is discharged by the water sprays. Preferably the pot-house is except for the chimneys substantially closed, only the floor being provided with openings for the supply of fresh air. In any case, the side walls of the pot-house in the upper two-thirds thereof between the floor and the roof-ridge are free from any air openings.

This design of the pot-house prevents the contaminated air from escaping into the open air without control. The hot contaminated air rises and can only leave the pot-house through the chimneys, where it is cleaned, for example by spraying with water. The fresh air enters the pot-house by suction through the openings in the floor and in the lower third of the side walls. Power-actuated ventilators are not necessary. Unlike the known gas cleaning equipments in which the waste gases are sucked from each cell through pipe-lines to the cleaning apparatus, in the pot-house according to the invention no such gas collecting system with power-actuated ventilators is necessary. But of course also in the new pot-house in addition such gas collecting systems may be installed.

The necessary changes of the whole air in the pot-house depend of course on the outer temperature. For example a change of 50 times an hour is not tolerated by the workmen in winter time, whilst it may be agreeable in summer time. On the other hand, since the ventilation in a pot-house according to the invention depends on the temperature difference between the hot room air and the colder outer air and on the wind conditions, it may be preferable to provide means for regulating the air flow through the air entrance openings or through the chimneys or through both places. The renewal of the air is independent of the type of the electrolytic cell and of its current intensity.

I have found that the height up to which openings may be arranged in the side walls of the pot-house without the danger of air escaping through these openings depends on the number of changes of the air in an hour. With a change of 30 times an hour this height is a maximum of one third of the side wall from the floor to the roof-ridge. That means that in this case no air escapes through the openings in the lower third of the side walls; on the contrary, air is sucked in through these openings. With an air change of 50 times an hour the openings may be arranged up to the middle of the height. But such a design is not advisable. It is preferable to arrange only few openings in the side walls; if a storm arises it may be necessary to close them. The total area of the openings through which the air enters is preferably at least double the total cross-sectional area of the chimneys at their inlet ends.

During the cleaning of the escaping air in the chimneys by spraying with water or a suitable solution, for example a diluted solution of sodium hydroxide, the fluorine components in the waste gases, especially the hydrofluoric acid, but also sulphur dioxide and other gases are dissolved and the dusty components are precipitated. The solution containing the washed out components of the air is collected and may be treated according to known methods for recovery purposes.

The accompanying drawing represents schematically an example of a pot-house according to my invention. Fig. 1 shows a section and Fig. 2 a perspective view. The pot-room 1 is built on a substructure to which the open air has free entrance. The substructure may be disposed underground as a cellar or overground as in Fig. 1. In the first case air-shafts must be provided for the supply of enough fresh air.

The fresh air enters the pot-room 1 through the openings 3 in the floor 4, the openings being covered with gratings. If there is no substructure the air must be guided to the openings 3 through special air-shafts.

In the pot-room 1 the electrolytic cells 5 are arranged in two parallel lines, the pots of the cells being lowered into the floor. The pots may have such a design that it is possible to sink them down into the substructure. The roof-ridge is covered with a chimney-like superstructure 6 which is divided by means of crosswalls 7 into several sections of a length of for example 10 meters each. Moreover each chimney-section is preferably divided by a longitudinal separating wall 8, so that no pouring rain may enter the room 1. Of course the chimney may have another shape. But experiments in the wind-channel have shown that the chimneys with cross-walls 7 according to Fig. 2 have the most favourable aerodynamic shape if their height $a$ is approximately the same as their width $b$. With a width of the pot-house of 25 meters a width of the chimney of 3.5 meters is sufficient.

The wind striking the pot-house causes a suction which assists the thermal ventilation. The effect of this suction is most regular and independent of the wind direction if the mentioned relation between height and width of the chimney is observed. Furthermore it proved to be favourable to arrange the longitudinal axis of the pot-house in an angle of 30–60° to the main wind direction, as in this case the ventilation is practically constant and independent of the wind force. For aerodynamic reasons it is also favourable to give the roof a slope of approximately 30°.

The chimneys may also be provided with means in the form of conventional dampers 8a for regulating the circulation of the air. This regulation may be also performed by controlling the air entrance openings in the substructure of the pot-house.

In the chimneys or just below them there are disposed spraying devices, for example in the form of tubes 10 which are connected with a pressure water pipe and which are provided with nozzles spraying the cleaning solution in the direction of the air flow and building up a close water curtain. The solution flowing down is collected in the channel 9 and lead to a dressing plant. To avoid the escape of fogs, arising from the spraying system, devices are arranged in the upper part of the chimneys, for example in the form of hurdles or wire gauzes 11, on which the fogs are precipitated. One must only take care that the way between the spray nozzles and these devices be as long as possible.

By the absorption of hydrofluoric acid and sulphur dioxide the sprayed solutions get acid and have a strong corroding effect. It is therefore advantageous to use plastics or material coated with plastics for the spraying device. For the same reason (for avoiding corrosion damages) it is also advisable to arrange the supporting structure of the roof beneath the spraying device and the collecting channel 9.

What I claim is:

1. A pot-house for an aluminum reduction plant having a floor and side walls extending from said floor and terminating at the top in a roof-ridge, a chimney above said roof-ridge having its inlet near said roof-ridge, said floor having air entrance openings and said pot-house having passage means below said floor free of forced ventilators, whereby air from the outside may be conducted through said means to said openings by natural draft, said side walls being free of air openings in the upper two-third sections thereof, spray devices near the entrance to said chimney arranged to direct sprays in the general direction of air flow through said chimney for cleaning the air before being discharged from said chimney and for simultaneously inducing an aspirating injector effect by which the drawing of the hot air rising in the pot-house is promoted through said chimney, whereby the pot-house is properly ventilated only by the natural currents induced without the use of power-actuated forced draft ventilators, and means below the spray devices and above the floor for collecting the spray liquid and conducting it away from below the spray devices.

2. A pot-house as described in claim 1, wherein the side walls are entirely closed, whereby the floor affords the only means by which fresh air is supplied to the interior of the pot-house.

3. A pot-house as described in claim 1, wherein the chimney consists of a single structure divided into several adjoining passageways by means of cross walls in said chimney extending from one side to the opposite side of the roof-ridge.

4. A pot-house as described in claim 3, wherein the chimney is further divided by a longitudinal wall in said chimney along said sides of the roof-ridge.

5. A pot-house as described in claim 1, wherein the height of the chimney is substantially the same as its width.

6. A pot-house as described in claim 1, wherein the area of the air entrance openings in the entire pot-house is at least double the cross-sectional area at the inlet end of the chimney.

7. A pot-house as described in claim 1, wherein means are provided in the upper part of the chimney for precipitating the fogs arising from the spray device.

8. A pot-house as described in claim 1, wherein means are provided in the chimney for controlling the circulation of the air therethrough.

9. A pot-house as described in claim 1, wherein a hollow substructure is provided for the pot-house into which fresh air is admitted for passage through the openings in the floor into the interior of the pot-house.

10. A pot-house as described in claim 1, wherein the pot-house is arranged with its longitudinal axis at an angle of 30–60° to the prevailing wind direction.

11. A pot-house as described in claim 1, in which the pot-house has a roof below the roof-ridge forming part of said side walls and sloping on both sides towards each other at an angle of approximately 30° with the horizontal.

12. A pot-house as described in claim 1, in which the pot-house has a sloping roof below the roof-ridge forming part of said side walls and the part of said side walls below said sloping roof forms a supporting structure for said roof and is located at a level below the level of the spray devices.

References Cited in the file of this patent

UNITED STATES PATENTS

| | | |
|---|---|---|
| 2,218,926 | Teichmann | Oct. 22, 1940 |
| 2,576,008 | Gladfelter | Nov. 20, 1951 |
| 2,610,569 | Horne | Sept. 16, 1952 |
| 2,679,795 | Geiger | June 1, 1954 |

FOREIGN PATENTS

| | | |
|---|---|---|
| 11,637 | Germany | 1880 |
| 268,153 | Great Britain | Mar. 31, 1927 |